(12) United States Patent
Sarmah et al.

(10) Patent No.: US 12,299,395 B2
(45) Date of Patent: May 13, 2025

(54) LEARNING EMBEDDED REPRESENTATION OF A CORRELATION MATRIX TO A NETWORK WITH MACHINE LEARNING

(71) Applicant: BLACKROCK FINANCE, INC., New York, NY (US)

(72) Inventors: Bhaskarjit Sarmah, Gurgaon (IN); Nayana Nair, Gurgaon (IN); Dhagash Mehta, Chester Springs, PA (US); Stefano Pasquali, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 370 days.

(21) Appl. No.: 18/148,374

(22) Filed: Dec. 29, 2022

(65) Prior Publication Data
US 2024/0012997 A1    Jan. 11, 2024

(30) Foreign Application Priority Data

Jul. 6, 2022    (IN) .............................. 202211038745

(51) Int. Cl.
*G06F 40/289* (2020.01)
*G06N 3/0495* (2023.01)
*G06N 3/08* (2023.01)

(52) U.S. Cl.
CPC ......... *G06F 40/289* (2020.01); *G06N 3/0495* (2023.01); *G06N 3/08* (2013.01)

(58) Field of Classification Search
CPC ....... G06F 40/289; G06N 3/0495; G06N 3/08
See application file for complete search history.

(56) References Cited

FOREIGN PATENT DOCUMENTS

| CN | 113032539 A | * | 1/2021 | |
|---|---|---|---|---|
| CN | 109885683 B | * | 12/2022 | |
| WO | WO-2025029357 A1 | * | 2/2025 | ............. G16H 10/60 |

OTHER PUBLICATIONS

Long Short-term memory network for learning sentences similarity using deep contextual embeddings (Year: 2021).*
Sentence embeddings and their relation with sentence structure (Year: 2024).*
Word2vec node2vec graph2vec X2vec towards a theory of vector embeddings of structured data (Year: 2020).*
Mantegna et al., "Hierarchical Structure in Financial Markets," The European Physical Journal B, 1999, pp. 193-197.

(Continued)

*Primary Examiner* — Mohammad K Islam
(74) *Attorney, Agent, or Firm* — Haynes and Boone, LLP

(57) ABSTRACT

System, method, and a computer program product for generating embeddings are provided. A machine learning framework generates a fully connected network from a dataset associated with words. The words correspond to nodes in the fully connected network. The weights are associated with correlations between the nodes and correspond to the links in the fully connected network. The machine learning framework transforms the correlations corresponding to the links into distances. The machine learning framework generates a sparse network from the fully connected network based on the distances. From the sparse network, machine learning framework determines sentence structures by traversing the nodes. Using the sentence structures, the machine learning framework uses a neural network to generate embeddings in the embedded space.

20 Claims, 7 Drawing Sheets

(56) References Cited

OTHER PUBLICATIONS

Letizia et al., "Corporate Payments Networks and Credit Risk Rating." EPJ Data Science, 2019, pp. 1-29.
Brandes, "On Variants of Shortest-Path Betweenness Centrality and their Generic Computation." Social Networks, 2008, pp. 1-22.
Tang et al., "Complexities in Financial Network Topological Dynamics: Modeling of Emerging and Developed Stock Markets." Complexity, 2018, pp. 1-31.
Huang et al., "A Financial Network Perspective of Financial Institutions' Systemic Risk Contributions." Physica A, 2016, pp. 183-196.
Brede, "Networks-An Introduction." Mark E.J. Newman, 2010, Oxford University Press, pp. 241-242.
Banerjee et al., "The Diffusion of Microfinance." Science, 2013, vol. 341, 1236498, 9 pages.
Grover et al., "node2vec: Scalable Feature Learning for Networks." Proceedings of the 22nd ACM SIGKDD International Conference on Knowledge Discovery and Data Mining, 2016, pp. 855-864.
Mikolov et al., "Distributed Representations of Words and Phrases and their Compositionality." Advances in Neural Information Processing Systems, 2013, pp. 1-9.
Caselles-Dupre et al., "Word2vec Applied to Recommendation: Hyperparameters Matter." Proceedings of the 12th ACM Conference on Recommender Systems, 2018, pp. 352-356.
Faruqui et al., "Problems With Evaluation of Word Embeddings Using Word Similarity Tasks." arXiv preprint arXiv:1605.02276, 2016, 6 pages.
Dolphin et al., "Stock Embeddings: Learning Distributed Representations for Financial Assets." arXiv preprint arXiv:2202.08968, 2022, 9 pages.
Bolukbasi et al., "Man is to Computer Programmer as Woman is to Homemaker? Debiasing Word Embeddings." Advances in Neural Information Processing Systems, 2016, pp. 4349-4357.
Rosenberg et al., "V-Measure: A Conditional Entropy-Based External Cluster Evaluation Measure." Proceedings of the 2007 Joint Conference on Empirical Methods in Natural Language Processing and Computational Natural Language Learning, pp. 410-420, Prague, Jun. 2007.

* cited by examiner

| | l | r | p | q | w | dim | Sector | Group | Subgroup | Average |
|---|---|---|---|---|---|---|---|---|---|---|
| | 50 | 10 | 0.5 | 2 | 5 | 16 | 0.28 | 0.67 | 0.85 | 0.60 |
| | 100 | 10 | 0.5 | 2 | 5 | 16 | 0.30 | 0.68 | 0.85 | 0.61 |
| | 100 | 10 | 0.5 | 2 | 5 | 32 | 0.25 | 0.68 | 0.85 | 0.59 |
| | 100 | 10 | 0.5 | 2 | 5 | 64 | 0.29 | 0.68 | 0.85 | 0.61 |
| | 100 | 10 | 0.5 | 2 | 5 | 128 | 0.24 | 0.69 | 0.85 | 0.59 |
| | 100 | 50 | 0.5 | 0.2 | 5 | 16 | 0.26 | 0.58 | 0.77 | 0.54 |
| | 100 | 50 | 0.5 | 2 | 5 | 16 | 0.32 | 0.68 | 0.84 | 0.61 |
| ← 502 | 100 | 50 | 2 | 0.5 | 5 | 16 | 0.35 | 0.7 | 0.84 | 0.63 |
| | 100 | 50 | 2 | 0.5 | 10 | 16 | 0.34 | 0.69 | 0.85 | 0.63 |
| | 100 | 50 | 2 | 0.5 | 20 | 16 | 0.35 | 0.68 | 0.85 | 0.63 |
| | 100 | 100 | 2 | 0.5 | 10 | 16 | 0.32 | 0.68 | 0.85 | 0.62 |
| | 100 | 100 | 2 | 0.5 | 20 | 16 | 0.35 | 0.69 | 0.85 | 0.63 |
| | 100 | 100 | 2 | 2 | 5 | 16 | 0.34 | 0.68 | 0.84 | 0.62 |
| | 100 | 100 | 0.5 | 2 | 5 | 16 | 0.26 | 0.67 | 0.85 | 0.59 |
| | 200 | 10 | 2 | 0.5 | 5 | 32 | 0.24 | 0.68 | 0.85 | 0.59 |
| | 200 | 10 | 2 | 0.5 | 5 | 32 | 0.35 | 0.67 | 0.84 | 0.62 |
| | 200 | 50 | 2 | 0.5 | 5 | 32 | 0.31 | 0.69 | 0.84 | 0.61 |

LEARNING EMBEDDED REPRESENTATION OF A CORRELATION MATRIX TO A NETWORK WITH MACHINE LEARNING

CROSS REFERENCE TO RELATED APPLICATIONS

This application claims priority to Indian Application No. 202211038745 filed on Jul. 6, 2022, which is incorporated by reference in its entirety.

TECHNICAL FIELD

The embodiments relate generally to machine learning systems, and more specifically to systems and methods for learning embedded representation of a correlation matrix.

BACKGROUND

Machine learning approaches that utilize concepts of network science rely on the computation of hand-generated properties of networks, such as degree centrality, closeness centrality, eigenvector centrality, average shortest path, and clustering coefficient, to name a few. These network properties arrive in various flavors and can be computed using a weighted or unweighted network, a directed or undirected network and so on. It can often become a manual exercise for a researcher to create features that capture relationships between the nodes of a network which can be further used in downstream applications.

Researchers may use entities as nominal categorical variables in downstream modeling tasks. As these features have high cardinality, using the traditional one-hot encoded representation of such features might increase the feature space and reduce the predictive power of the data especially in case of small data problems. There are also shortcomings of using one-hot encoded representations for high cardinality nominal categorical variables. For example, one-hot encoded representations do not consider similarity between entities that form the network and treat each representation as independent of other representations.

BRIEF DESCRIPTION OF THE DRAWINGS

FIG. 5 is a diagram of a table illustrating hyperparameters, according to some embodiments.

Figure 1:
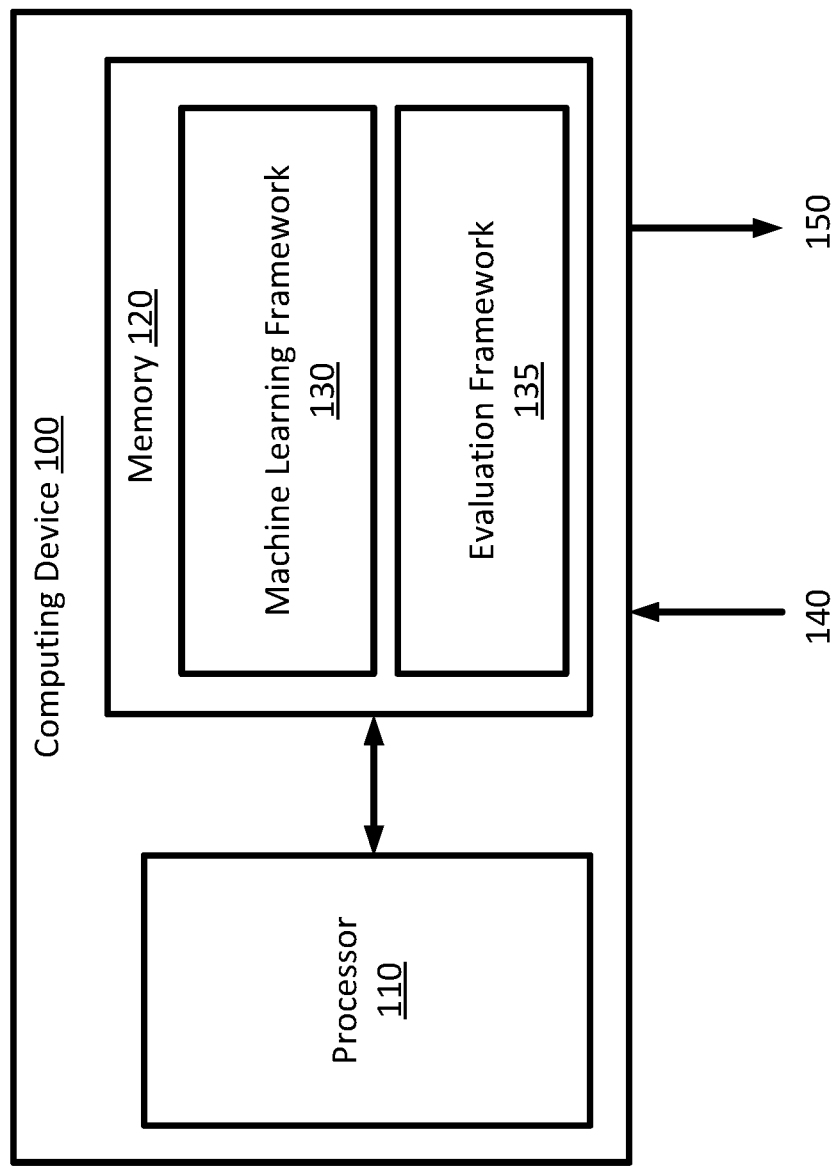
FIG. 1 is a simplified diagram of a computing device that implements a machine learning framework, according to some embodiments described herein.

In the figures, elements having the same designations have the same or similar functions.

DETAILED DESCRIPTION

Artificial intelligence implemented with neural networks, machine learning, and deep learning models have demonstrated promise as techniques for automatically analyzing real-world information with human-like accuracy. In general, such neural networks, machine learning, and deep learning models receive input information and make predictions based on the same. Whereas other approaches to analyzing real-world information may involve hard-coded processes, statistical analysis, and/or the like, neural networks learn to make predictions gradually, through trial and error, in a machine learning process. A given neural network model may be trained using a large number of training samples, processing those training samples iteratively until the neural network model begins to consistently make similar inferences from the examples that a human might make. Neural network models have been shown to outperform and/or have potential to outperform other computing techniques in various applications.

The embodiments are directed to a machine learning framework that extracts features from data and creates an n-dimensional vector representation of these features. The n-dimensional vector representations may be referred to as embeddings in an embedded space (or an n-dimensional vector space). The embeddings may capture relationships between the data that can be used to model or solve the downstream tasks. The machine learning framework may apply to various types unstructured data.

In some embodiments, a neural network in the machine learning framework may use natural language processing (NLP) to learn the embeddings. In the NLP, words may be represented by n-dimensional vectors. The embeddings are capable of capturing semantically similar words in the n-dimensional vector space. The embodiments are directed to using NLP to create an n-dimensional vector representation of words that represent different type of data. Because assets may be represented by words, the NLP processing may be applied to generate embeddings for different assets.

In some embodiments, the data may include assets, such as financial assets comprising stocks, bonds, commodities, exchange-traded funds (ETFs), mutual funds, foreign currencies, private equities, and the like. The stocks, in some embodiments may comprise the S&P 500 universe of stocks. The neural network in the machine learning framework may be trained to learn the embeddings for each asset in the asset network based on the price information of the asset. The embeddings may capture relationships between the assets, and may be used to identify similar and dissimilar assets. This approach may also be extended to other entities, where nodes of a network may represent portfolios, sectors, brokers, and the like.

To create embeddings for the financial assets, such as stocks or other instruments that may be represented by words, a machine learning framework may receive data that includes the financial assets and the financial asset features, such as price information. The machine learning framework may compute the log returns from the price information and may generate a correlation matrix. The correlation matrix may include entries that are price correlations between every pair of the financial asset. Next, the machine learning framework may transform the correlation matrix into a distance matrix. The distance matrix may include entries where price correlations are transformed into distances for every pair of the financial asset. The machine learning framework may transform the distance matrix into a fully connected network where each financial asset is a node, and a link between a pair of nodes is a weight that corresponds to the distance entry in the distance matrix. From the fully connected network, the machine learning framework may generate a sparse network using a minimum spanning tree (MST) algorithm or another sparse algorithm. The sparse algorithm may filter the links in the fully connected network while preserving important connections. Next, the machine learning framework may create sentence structures (which may be directed sub-networks in the sparse network). To create the sentence structures, the machine learning framework may apply a Node2Vec algorithm to the sparse network. The Node2Vec algorithm may take random walks of predefined length from various nodes of the sparse network. The node from which a walk originates may be a target asset and the set of context assets may be the sentence structure that is created by the corresponding walk through the nodes. The machine learning framework may use a shallow neural network and a Word2Vec algorithm to learn the embeddings from the sentence structures. The set of context assets and the target asset combinations may be used to train the shallow neural network to generate the embeddings.

The embodiments are also directed to an evaluation module. The evaluation module may evaluate the embeddings by tuning hyperparameters. This is unlike conventional systems that evaluate embeddings on the downstream tasks. The evaluation module may tune the hyperparameters by optimizing the V-measure between clusters of embeddings. The V-measure may be based on the Global Industry Classification Standard (GICS) categories. The evaluation module may also evaluate the embeddings using similarity and analogical inference of the financial assets.

As used herein, the term "network" may comprise any hardware or software-based framework that includes any artificial intelligence network or system, neural network or system and/or any training or learning models implemented thereon or therewith.

As used herein, the term "module" or "framework" may comprise hardware or software-based framework that performs one or more functions. In some embodiments, the module may be implemented on one or more neural networks.

Further embodiments are discussed below.

FIG. 1 is a simplified diagram of a computing device that implements a machine learning framework, according to some embodiments described herein. As shown in FIG. 1, computing device 100 includes a processor 110 coupled to memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes a machine learning framework 130 and evaluation module 135. Machine learning framework 130 may receive input 140. An example input 140 may include data with features. In some embodiments, input 140 may include financial assets, such as S&P 500 universe of stocks for a particular year, and features may include price data. Notably, although the examples below describes stocks, the embodiments are applicable to other financial assets, including bonds, commodities, ETFs, mutual funds, foreign currencies, private equities, and the like. An output 150 of machine learning framework 130 may be embeddings generated from input 140. Example embeddings may be embeddings associated with the financial assets. In case of S&P 500 universe of stocks, output 150 may include embeddings of the stocks. Evaluation framework 135 may receive the embeddings and evaluate the embeddings using clustering and V-measure techniques. Based on the evaluation, machine learning framework 130 may finetune the hyperparameters of the neural network that generated the embeddings. Evaluation framework 135 may also use similarity and analogical inference techniques to determine relationships between different data, e.g., a relationship between stocks, based on the embeddings.

Figure 2:
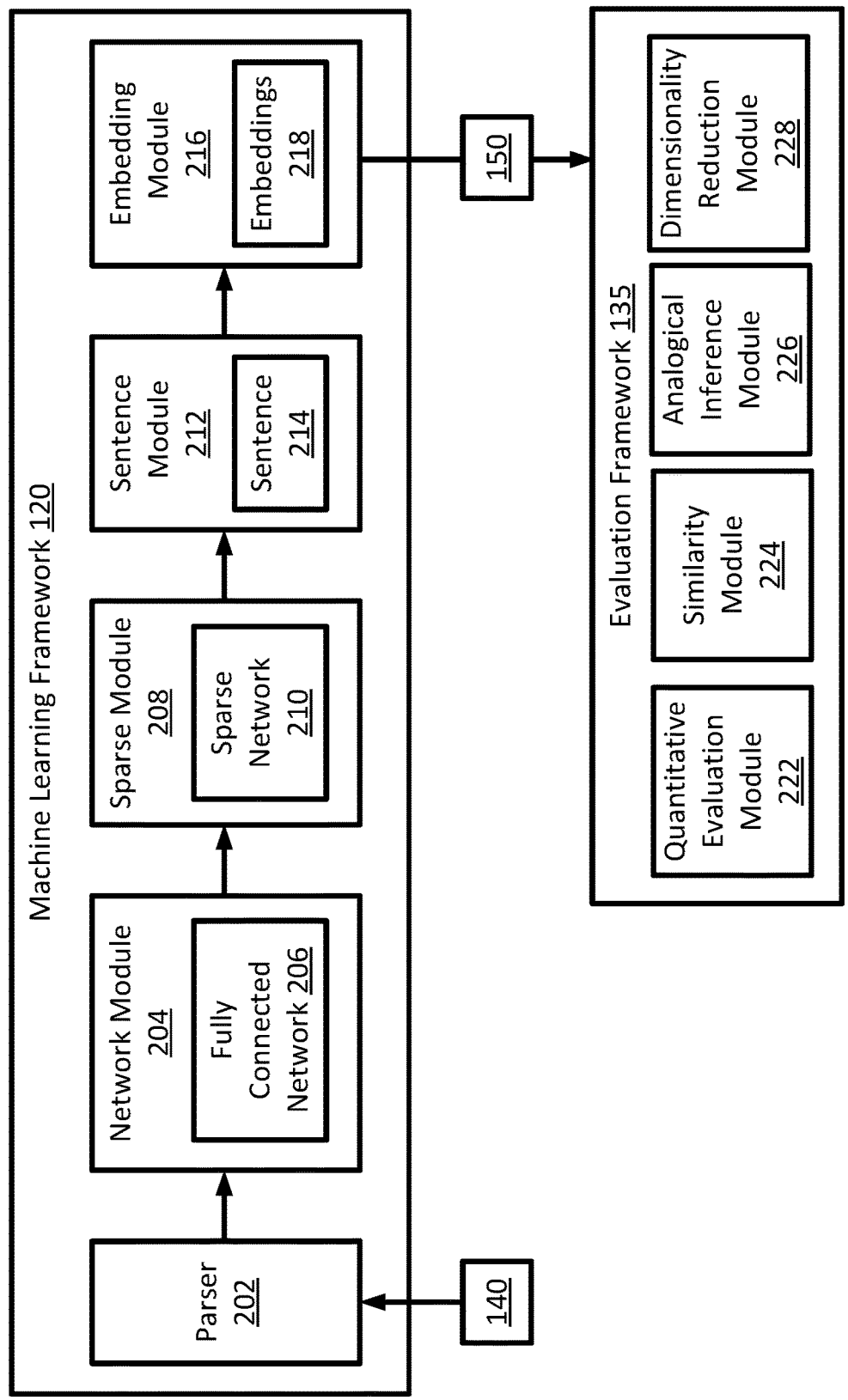
FIG. 2 is a block diagram of a machine learning framework and an evaluation module, according to some embodiments.

FIG. 2 is a block diagram 200 of a machine learning framework 130, according to some embodiments. As illustrated in FIG. 2, machine learning framework 130 may receive input 140. As discussed above, input 140 may be financial data, such as financial assets, including stocks from S&P 500, and features associated with the financial data. The financial data may be represented as words. Input 140 may also include other types of data, particularly data that may be represented using text and/or words, and various attributes associated with the data.

In some embodiments, machine learning framework 130 may include a parser 202. Parser 202 may parse, clean, and format input 140. For example, parser 202 may parse input 140 to obtain ticker and price features from the financial data. A ticker may be a unique series of letters that represents a stock. The price data may be an adjusted close price for each stock over a predefined time period. In some instances, the predefined time period may be one year, or a particular year, such as 2021. In other instances, parser 202 may parse a word or text from input 140 the represents a particular object, as well as features that correspond to the object.

In some embodiments, machine learning framework 130 may include a network module 204. Network module 204 may receive the parsed data, including the ticker and price data in case of financial data and generate a fully connected network 206. Fully connected network 206 may be an undirected weighted network that includes text or words as nodes and correlation between nodes as links between each pair of nodes. In some embodiments, each node in fully connected network 206 may be connected to every other node in fully connected network 206. With respect to the financial data, each node of the fully connected network 206 may represent a stock and a link between the nodes may represent a correlation of log returns between the pair of stocks (the two nodes). Fully connected network 206 may include stocks as nodes because stocks or the tickers associated with the stocks may be represented using text (e.g., combination of letters or words). For example, for a stock i (node i in fully connected network 206), the log return may be calculated using a numerical value at different times, such as daily adjusted close prices at day t and at day t−1 (previous day) as follows:

$$r_i(t) = \log P_i(t) - \log P_i(t-1) \quad \text{Equation (1)}$$

where $P_i(t)$ denotes the daily closing price of the i-th stock on the t-th day and $r_i(t)$ denotes the return of the i-th stock at the t-th day. After network module 204 generates the log return $r_i(t)$ for all stocks (nodes) in input 140, e.g., stocks from 1, . . . , n with n being a positive integer, network module 204 may generate weights for the links in the fully connected network 206 by determining correlations for each pair of stocks (pair of nodes). A correlation $\rho_{ij}$ between a pair of stocks, i, j (represented by nodes i and j) may be determined as follows:

$$\rho_{ij} \frac{\langle r_i r_j \rangle - \langle r_i \rangle \langle r_j \rangle}{\sqrt{(\langle r_i^2 \rangle - \langle r_i \rangle^2)(\langle r_j^2 \rangle - \langle r_j \rangle^2)}} \quad \text{Equation (2)}$$

The network module 204 may determine the correlation $\rho_{ij}$ for each pair of nodes. For example, network module 204 may execute Equation (2) for every i and j from 1, . . . , n, where n is the total number of stocks (nodes).

In some instances, network module 204 may represent fully connected network 206 as a correlation matrix p. The rows and columns of the correlation matrix p represent each node in fully connected network 206 between 1, . . . , n. Each entry in correlation matrix p may correspond to the correlation $\rho_{ij}$ between nodes i and j.

In some instances, network module 204 may convert the correlation matrix ρ into a distance matrix d. Converting the correlation matrix ρ into a distance matrix d may identify links with high correlations and low correlations. Links with low correlations may be removed as discussed below. To convert the correlation matrix ρ into a distance matrix d, network module 204 may convert each correlation $\rho_{ij}$ in correlation matrix ρ into distance $d_{ij}$ in distance matrix d as follows:

$$d_{ij} = \sqrt{2(1-\rho_{ij})} \quad \text{Equation (3)}$$

where $d_{ij}$ is a distance between a pair of stocks i and j, where i and j are from 1, . . . , n, and where n is the total number of stocks (nodes). Fully connected network 206 may also be represented using the distance matrix d, where rows and columns of the distance matrix d represent each node in fully connected network 206 between 1, . . . , n. Each entry in distance matrix d may correspond to the distance $d_{ij}$ between nodes i and j.

Figure 3:
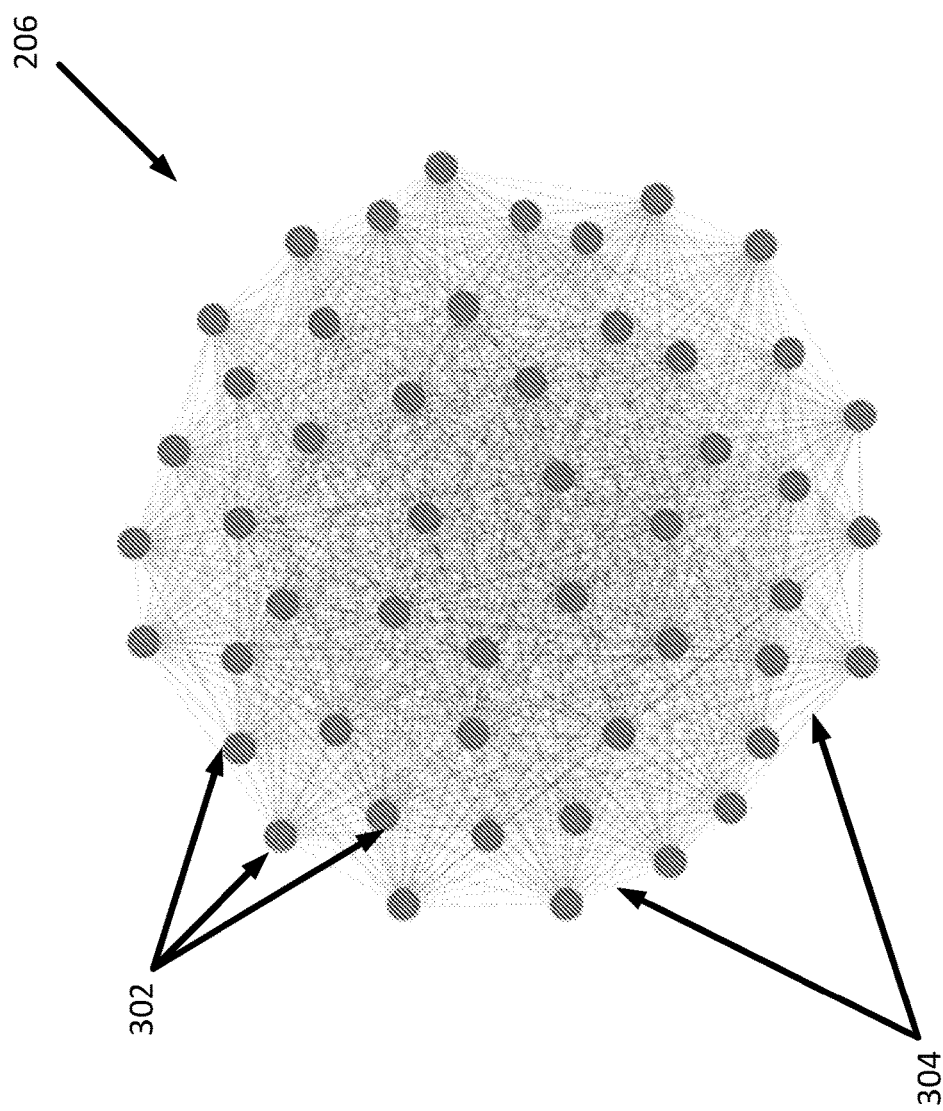
FIG. 3 is a diagram of a fully connected network, according to some embodiments.

FIG. 3 is a diagram 300 of a fully connected network, according to some embodiments. In fully connected network 206 illustrated in FIG. 3, each node 302 is connected to every other node 302 using links 304. For example, in the fully connected network 206 where each node 302 is a stock, each stock is connected to every other stock in fully connected network 206. Link 304 between a pair of stocks denotes a correlation coefficient of log return between the pair of stocks or a distance between the pair of stocks. In this way, analyzing the weighted fully connected network 206 may provide complete information about the underlying relationship among the stocks.

Going back to FIG. 2, machine learning framework 130 may include a sparse module 208. Sparse module 208 may convert fully connected network 206 into sparse network 210. The sparse network 210 may have the same number of nodes as the fully connected network 206, but has fewer links than the fully connected network 206. By converting fully connected network 206 into sparse network 210, sparse module 208 may remove noise or unimportant links from the fully connected network 206. To convert fully connected network 206 into sparse network 210, sparse module 208 may apply a minimum spanning tree (MST) algorithm, average linkage minimum spanning tree algorithm, planar maximally filtered graph algorithm or another algorithm that removes links from fully connected network 206.

In some embodiments, MST algorithm may preserve the links of the fully connected network 206 which may be used to traverse the entire network with minimum distance. In this way, MST may preserve the links with low correlations that otherwise may be removed by the sparse module 208. To remove links with low correlations, sparse module 208 may instead traverse fully connected network 206 that associates distances $d_{ij}$, instead of correlations $\rho_{ij}$ with links between nodes. By applying the MST algorithm to distance matrix d or fully connected network 206 that includes links as weighted distances, sparse module 208 may generate sparse network 210 that excludes low correlation links.

Figure 4:
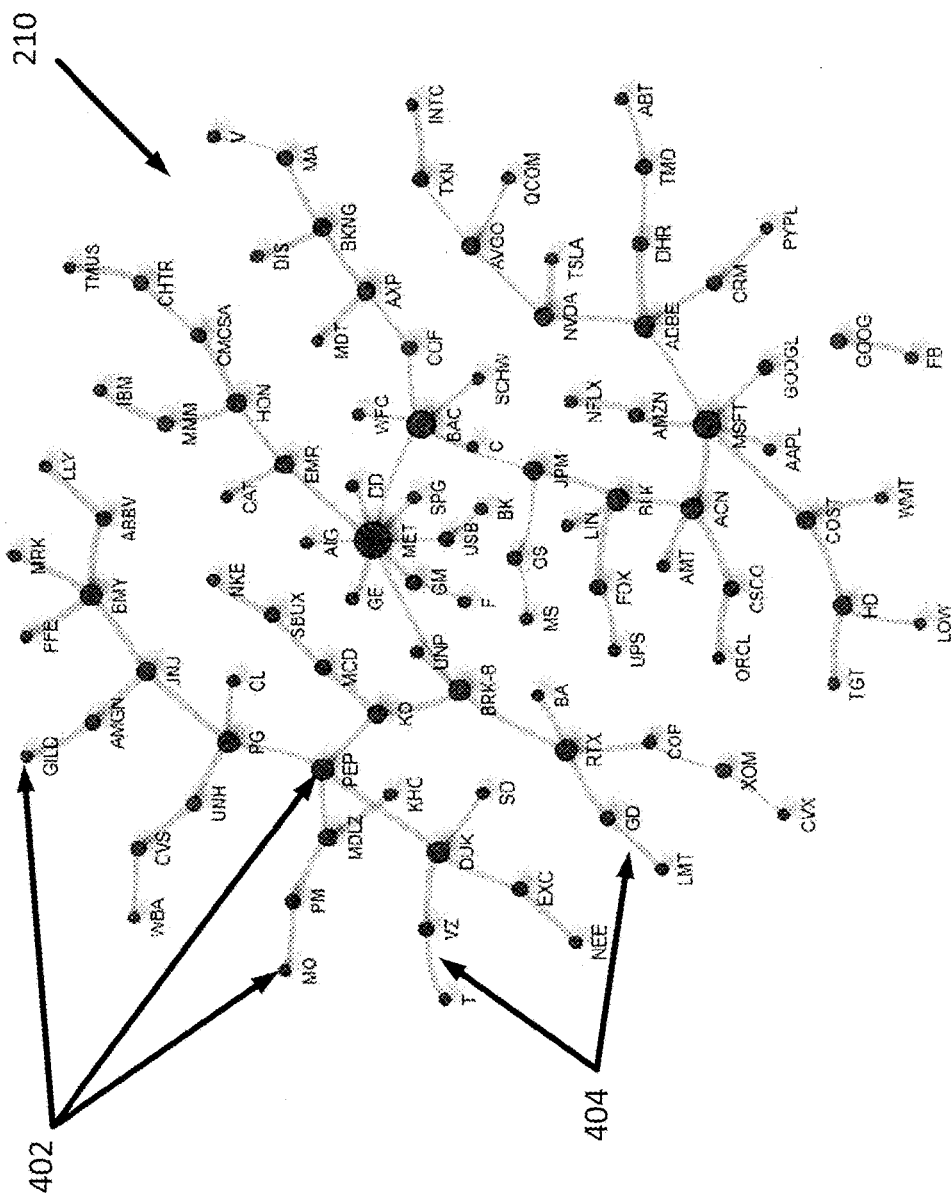
FIG. 4 is a diagram of a sparse network, according to some embodiments.

FIG. 4 is a diagram 400 illustrating a sparse network, according to some embodiments. Sparse network 210 in FIG. 4 may be a sparse weighted network that includes the stocks as nodes 402 and links 404. Compared to the fully connected network 206 illustrated in FIG. 3, sparse network 210 has fewer number of links 404 than fully connected network 206. In fact, links 404 from one of nodes 402 connect to few other nodes in sparse network 210. The sparse network 210 was generated using MST algorithm.

In some embodiments, machine learning framework 130 may include a sentence module 212. Sentence module 212 may receive the sparse network 210 and generate sentence structures 214 from sparse network 210. In some instances, sentence module 212 may use Node2Vec algorithm to learn lower dimensional representation for nodes in the sparse network 210. For example, the Node2Vec algorithm may generate a set of random walks of a specific length through sparse network 210. The walks may start at each node of sparse network 210. The nodes in sparse network 210 may be considered a vocabulary, while each random walk in the set of random walks may be a sentence structure 214. Table I, below, illustrates an example of the sentence structure 214 and a corresponding target node from which the sentence structure was generated.

TABLE I

| Sentence Structure | Target |
| --- | --- |
| A, ALGN, NOW, ETR | TGT |
| ALGN, TGT, ETR, ROL | NOW |
| IR, NSC, GNRC, HOLX | GPN |
| NSC, GPN, HOLX, PTC | GNRC |
| A, ICE, SYF, WAB | OKE |
| ICE, OKE, WAB, DG | SYF |

In some embodiments, sentence module 212 may be tuned using hyperparameters. The hyperparameters may be tuned to create the corpus of sentence structures 214 from sparse network 210. An example hyperparameter may be a number of random walks (r) from each node in the sparse network 210 to generate sentence structures 214. Another hyperparameter may be a length of each random walk (l) from each node in the sparse network 210. The length may be a number of hops of each random walk from each node in the sparse network 210. Another hyperparameter may be a probability p, which is the probability that a random walk will return to the node it visited previously. Another hyperparameter may be a probability q, which is the probability that a random walk will explore the unexplored part of the sparse network 210.

Once sentence module 212 generates sentence structures 214, machine learning framework 130 may use an embedding module 216 to generate embeddings 218. As discussed above, embeddings 218 may also be referred to as n-dimensional vector representations or vector embeddings. Embedding module 216 may convert the sentence structure 214 into embeddings 218 in the embedded space. The embeddings may be a lower dimensional representation of sentence structure 214 that captures meaningful semantic and syntactic relationships between words in the corpus. During the training stage, embedding module 216 may train a shallow neural network to predict the target word provided by a set of context words by minimizing categorical cross entropy loss. The set of context words may be sentence structures 214. As part of the training process, shallow neural network generates embeddings 218. Sentence structures 214 and a corresponding target shown in Table I above may be examples of the training data. Once the shallow neural network is trained, embedding module 216 enters an inference stage. In the inference stage, embedding module 216 receives words, such as stocks and uses embeddings 218 to analyze the words, such as stocks. The embeddings 218 may be an average of the weight matrices obtained from the hidden layer and the output layer respectively of the shallow neural network. In some embodiments, embedding module 216 may use a Word2Vec algorithm. The Word2Vec algorithm may use a Continuous Bag-of-Words (CBOW) or Skip-gram models to create embeddings. The Continuous Bag-of-Words (CBOW) model may determine the surrounding context words to predict the target word. The Skip-gram model may use the target word as input to generate the context or surrounding words as the output.

In some embodiments, embedding module 216 may be tuned using hyperparameters. For example, when embedding module 216 implements the Word2Vec algorithm, the window size (w) and vector size (dim) hyperparameters may be tuned to quantitatively evaluate the strength of the generated embeddings 218. The window size (w) hyperparameter may be a maximum distance between the current and predicted word within a sentence. The vector size (dim) hyperparameter may be the dimensionality of the vector embeddings associated with a word.

In some embodiments, machine learning framework 130 may include an evaluation module 220. Evaluation module 220 may be software or a combination of software and hardware that may receive embeddings 218 and evaluate the embeddings 218. Evaluation module 220 may include a quantitative evaluation module 222, a similarity module 224, an analogical inference module 226, and a dimensionality reduction module 228. Quantitative evaluation module 222 evaluates embeddings quantitatively, while similarity module 224 and analogical inference module 226 evaluates embeddings qualitatively. Dimensionality reduction module 228 may generate a graph that includes embeddings in a reduced dimensionality space.

In some embodiments, quantitative evaluation module 222 may validate embeddings 218 using the ground truth labels. However, in some instances, the ground truth labels may not exist or be available for certain types of data. For example, ground truth labels may not be available for financial data, such as stocks. In this case, quantitative evaluation module 222 may use other existing classifications. With respect to stocks, quantitative evaluation module 222 may use a Global Industry Classification Standard (GICS). The GICS may provide a classification system that classifies companies associated with stocks into coarse to granular categories, such as industry sectors, industry groups, industry sub-groups, and the like. Generally, data, such as stock data that is from the same class should be highly correlated as opposed to data from different classes. Accordingly, embeddings 218 associated with stocks that are in the same GICS class (e.g., financial sector, oil sector, technology sector, etc.) are closer to each other in the embedded space than the stocks that are in different GICS classes.

In some embodiments, quantitative evaluation module 222 may use a clustering algorithm, such as a K-means clustering algorithm to cluster stocks based on embeddings 218. The K in the clustering algorithm may be a number of classes in a category. The K-means clustering algorithm may cluster the embeddings 218 such that embeddings 218 associated with one stock are in one of the possible classes.

Quantitative evaluation module 222 may evaluate the mapping between the K clusters in the embedded space and classes using an external entropy-based cluster validation technique called V-measure. This metric is independent of the absolute values of the labels. That is, a permutation of the class or cluster label values does not change the value of V-measure. Additionally, this metric is symmetric. That is, swapping labels with predictions may return the same score. This may be useful to measure the agreement of two independent label assignment strategies on the same dataset where the ground truth is unknown.

The V-measure may be defined as the harmonic mean between the homogeneity and completeness, as follows:

$$V - \text{measure} = \frac{(1 + \beta)(\text{Homogeneity})(\text{Completeness})}{(\beta \times \text{Homogeneity} + \text{Completeness})} \quad \text{Equation (4)}$$

When each of the clusters only contains data points which are members of a single ground truth class, the clustering is called homogeneous. If a cluster has data points from two or more different classes it is called a heterogeneous cluster. Completeness may be defined as the measure of a cluster when a cluster contains all the elements of a class, as opposed to a cluster that fails to capture one or more elements of the class. The β denotes the ratio of weight attributed to homogeneity versus completeness. A default value for β may be 1.

In some embodiments, quantitative evaluation module 222 may compute the V-measure between K clusters in each of the three GICS categories: sector, industry group, and industry sub-group. The larger the V-measure for a hyperparameter combination, the better the embeddings 218. The hyperparameters may be tuned to maximize the V-measure.

FIG. 5 is a diagram 500 of a table illustrating results for various values of hyperparameters, according to some embodiments. The table in FIG. 5 illustrates the results for different combinations of hyperparameters including the length for each random walk (l), number of random walks (r), probability p, probability q, window size (w) and vector size (dim). For each hyperparameter combination, sentence module 212 may generate sentence structures 214 and embedding module 216 may generate embeddings 218 from the sentence structures 214 to learn the embedded space. The quantitative evaluation module 222 may then generate clusters from embeddings 218 using the K-means algorithm where the size of K=9, 59, and 169 for GICS industry sector, industry group, and industry sub-group categories. The sizes for K above may correspond to as many classes of the above GICS categories. The table in FIG. 5 includes the V-measure values for each of the categories (Sector, Group, Subgroup) in separate columns, and the average of the V-measure values across the three categories. Notably, as the GICS classification becomes more granular, the V-measure increases, which means that the stocks tend to be more closely related among each other. The average of the V-measure values over all three categories is used as a tiebreaker to identify the optimal combinations of the hyperparameters, meaning that the embedding 218 in which on average all levels of GICS classification are clustered well. The table in FIG. 5 includes a hyperparameter combination 502, which generates optimal embeddings 218.

Similarity module 224 may evaluate embeddings 218 qualitatively. In sparse network 210 not all nodes are connected to each other. For example, in the S&P 500 universe of stocks, the sparse network 210 may have 504 nodes and 503 edges. However, in the embedded space, similarity module 224 may identify similar stocks from the same sector even if the stocks are not connected by links in sparse network 210. For example, similarity module 224 may identify, for every stock, similar stocks and rank the stocks according to a chosen distance metric, even if the pairs of stocks are not directly connected in sparse network 210. Similarity module 224 may determine similarities from embeddings 218 by computing pairwise cosine distance between embeddings 218 of the stocks in sparse network 210 as follows:

$$d_{i,j}^{cos} = 1 - \frac{x_i \cdot x_j}{\|x_i\| \|x_j\|}$$ Equation (5)

where $x_i$ and $x_j$ are embeddings 218 for the i-th and j-th stock respectively.

Table 2, below, illustrates stocks most similar to the JPM stock according to the cosine similarity scores in the embedded space as determined using Equation (5). Notably, the ten similar stocks belong to the same GICS sector as JPM, e.g., the financial sector, even though there were no direct links between the stocks in sparse network 210, such as the one illustrated in FIG. 4.

TABLE II

| Most Similar | Similarity Score | Industry Sector |
| --- | --- | --- |
| GS | 0.928 | Financial |
| BAC | 0.925 | Financial |
| MS | 0.901 | Financial |
| C | 0.897 | Financial |
| SCHW | 0.857 | Financial |
| TFC | 0.806 | Financial |
| RJF | 0.769 | Financial |
| USB | 0.729 | Financial |
| NTRS | 9.725 | Financial |
| WFC | 0.666 | Financial |

To identify similar stocks, similarity module 224 may be trained to receive a word, such as stock "JPM" and output similar stocks in Table 2 by computing the similarity score as set forth in Equation (5) for embeddings of JPM to embeddings of other stocks in embeddings 218.

Analogical inference module 226 may capture arithmetic relationships between words in an embedding space. For example, given a set of three words, represented by "a", "b", and "c", analogical inference module 226 may identify a word represented by "d" for which a relationship "c is similar to d" is the same or similar as a relationship "a is similar to b." For instance, in the example of "Man is to King as Woman is to?" can be solved algebraically by embeddings of vector("King")−vector("Man")+vector("Woman") to produce a vector representation of the word "Queen."

Analogical inference module 226 may also use embeddings 218 that embedding module 216 may have learned for stock data, to make similar analogical inferences. For example, for a question "JPM is to GS as JNJ is to?," analogical inference module 226 may produce an embedding vector in embeddings 218 that is close to the vector representation for stock AMGN. Table III, below, illustrates examples that analogical inference module 226 may generate using embeddings 218:

TABLE III

| Analogy | Similarity |
| --- | --- |
| JPM is to GS as MSFT is to GOOGL | 0.882 |
| JPM is to GS as JNJ is to AMGN | 0.837 |

In an embodiment, analogical inference module 226 may determine data that is different from other data. Suppose analogical inference module 226 receives four embeddings 218 associated with a set of four stocks: JPM, MS, GS and GOOGL. Out of these four stocks, the GICS classifies GOOGL in a technology sector and JPM, MS, and GS in a finance sector. Accordingly, GOOGL's classification does not match with the classification of the other three stocks. Analogical inference module 226 may process embeddings 218 associated with JPM, MS, GS and GOOGL and make a distinction between stocks in technology and finance sector, although this information was not explicitly provided in embeddings 218. In other words, analogical inference module 226 may determine that GOOGL is different from JPM, MS, and GS. In the second example, suppose analogical inference module 226 receives embeddings 218 associated with a set of stocks that includes JNJ, BMY, PFE and HD. Analogical inference module 226 may determine that JNJ, BMY, and PFE belong to the pharmaceutical sector, whereas HD belongs to the consumer cyclical sector. In another example, analogical inference module 226 may use embeddings 218 associated with UAL, AAL, DAL, and TSLA stocks to illustrate that stock TSLA is the most dissimilar out of the UAL, AAL, DAL, and TSLA stocks. This is consistent with the GICS classification that classifies TSLA in a consumer cyclical sector and UAL, AAL and DAL in a consumer discretionary sector. Table IV, below, summarizes the analogical inference module 226 identifying a stock that is different from other stocks in a set of stocks based on the embeddings 218.

TABLE IV

| Analogy | Does Not Match |
| --- | --- |
| Does not match from JPM, MS, GS, GOOGL | GOOGL |
| Does not match from JNJ, BMY, PFE, HD | HD |
| Does not match from UAL, AAL, DAL, TSLA | TSLA |

In an embodiment, analogical inference module 226 may determine data that is most similar to other data. For example, analogical inference module 226 may use embeddings 218 to identify a most similar stock from a list of stocks for a given query stock. Suppose analogical inference module 226 may receive a query stock GOOGL and a set of stocks which includes JNJ, MS, MOS and FB. Based on embeddings 218 associated with the set of stocks which includes JNJ, MS, MOS and FB, analogical inference module 226 may identify FB as the stock that is most similar to GOOGL. In another example, analogical inference module 226 may receive a query stock BLK and a set of stocks which includes TSLA, STT, JNJ, and AAPL. Based on embeddings 218 for the set of stocks TSLA, STT, JNJ, and AAPL, analogical inference module 226 may identify STT as the stock that is most similar to BLK. In yet another example, analogical inference module 226 may receive a query stock WMT and a set of stocks which includes CVS, COST, JNJ, and MSFT. Based on embeddings 218 for the set of stocks which includes CVS, COST, JNJ, and MSFT, analogical inference module 226 may identify COST as the stock that is most similar to WMT. Table V, below, summarizes the analogical inference module 226 identifying a stock that is most similar to other stocks in a set of stocks based on the embeddings 218.

TABLE V

| Analogy | Match |
| --- | --- |
| Most similar to GOOGL given JNJ, MS, MOS, FB | FB |
| Most similar to BLK given TSLA, STT, JNJ, AAPL | STT |
| Most similar to WMT given CVS, COST, JNJ, MSFT | COST |

Figure 6:
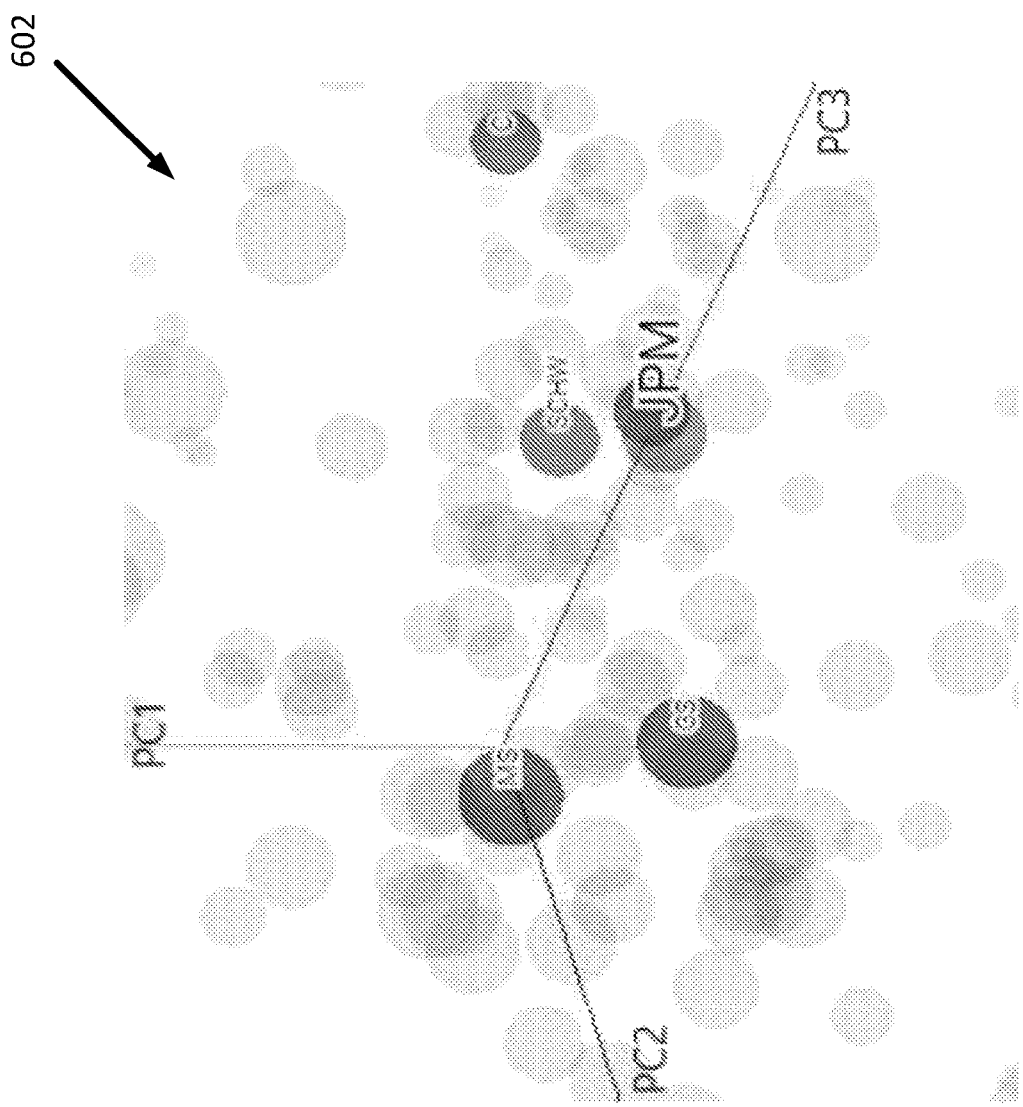
FIG. 6 is a diagram of a graph illustrating embeddings in a three-dimensional space, according to some embodiments.

In an embodiment, dimensionality reduction module 228 may use a dimensionality reduction technique on embeddings 218. For example, dimensionality reduction module 228 may use a principal component analysis technique to reduce the 16-dimensional embedding space into a 3-dimensional embedding space. Dimensionality reduction module 228 may also generate a graph that illustrates embeddings 218 in the reduced embedded space. FIG. 6 is a diagram 600 of a three-dimensional embedded space, according to some embodiments. In FIG. 6, the graph 602 illustrates a 3-dimensional visualization of the embeddings for stock JPM and the stocks that are nearest to the JMP. For example, based on graph 602, the stocks near to JMP may be GS, SCHW, C, and MS. The stocks near to JMP on graph 602 may indicate the stocks that are similar to JMP.

Figure 7:
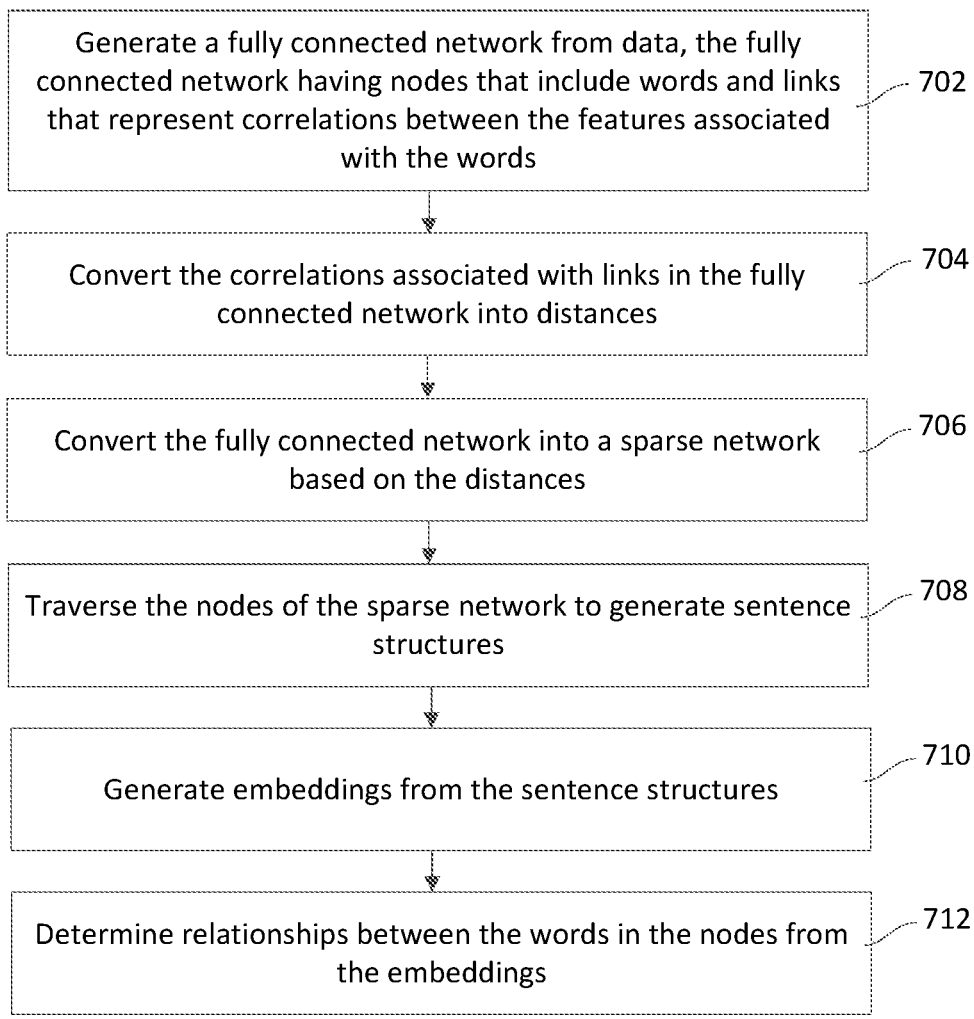
FIG. 7 is a flowchart of a method for generating embeddings, according to some embodiments.

FIG. 7 is a simplified diagram of a method 700 for generating embeddings, according to some embodiments. One or more of the processes 702-712 of method 700 may be implemented, at least in part, in the form of executable code stored on a non-transitory, tangible, machine-readable media that when run by one or more processors may cause the one or more processors to perform one or more of the processes 702-712.

At process 702, a fully connected network is generated. For example, network module 204 may receive data, such as stocks, words, etc., and generate a fully connected network 206. As discussed above, the fully connected network 206 may include data, e.g., words or stocks as nodes and links to all other nodes in fully connected network 206. In some instances, the links may be associated with a weighted correlation between a pair of nodes. The correlation between a pair of nodes that are stocks may be based on the log returns calculated from the features associated with the nodes, such as log returns determined from the adjusted close day prices of the stocks. Further, in some instances, fully connected network 206 may be represented by or be generated from a correlation matrix $\rho$ where the nodes i and j are represented by rows and columns from 1, . . . , n, and the correlation $\rho_{ij}$ between the nodes i and j is represented by the entry in the correlation matrix $\rho$.

At process 704, the correlations in the fully connected network are converted to distances. For example, network module 204 may convert the correlations p ii between the pairs of nodes in fully connected network 206 to distances d 11. In some instances, network module 204 may convert correlation matrix $\rho$ into a distance matrix d prior to generating fully connected network 206 and then generates fully connected network 206 from the distance matrix d.

At process 706, a sparse network is generated. For example, sparse module 208 generates sparse network 210 from fully connected network 206 using an MST or another sparse algorithm. The algorithm removes links from the fully connected network 206 that the algorithm considers to be unimportant.

At process 708, sentence structures are generated. For example, sentence module 212 receives sparse network 210 and generates sentence structures 214 from sparse network 210. In some instances, sentence module 212 may use a Node2Vec algorithm to generate sentence structures 214 by taking a set of random walks from each or a subset of nodes in sparse network 210. The characteristics for the set of random walks may be based on one or more hyperparameters.

At process 710, embeddings are generated. For example, embedding module 216 may receive sentence structures 214 and generate embeddings 218 from sentence structures 214 in the embedded space. In some instances, embedding module 216 may use a Word2Vec algorithm to generate embeddings 218. The embeddings 218 may capture the relationships between words in the nodes. Additionally, embeddings 218 may be represented by an n-dimensional vector representation in an n-dimensional vector space. The characteristics for the embeddings 218 may be based on one or more hyperparameters.

At process 712, embeddings are analyzed. For example, evaluation module 220 may analyze embeddings 218 to determine similarity between words or stocks that are represented by nodes in sparse network 210.

Some examples of computing devices, such as computing device 100 may include non-transitory, tangible, machine readable media that include executable code that when run by one or more processors (e.g., processor 110) may cause the one or more processors to perform the processes of various methods. Some common forms of machine-readable media that may include the processes are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

In this description, specific details are set forth describing some embodiments consistent with the disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for generating embeddings, the method comprising:
   generating a fully connected network associated with words, wherein a node in the fully connected network includes a word and a link between a pair of nodes is a correlation between a pair of words corresponding to the pair of nodes;
   converting correlations associated with links in the fully connected network into distances;
   converting, using a sparse algorithm, the fully connected network into a sparse network based on the distances;
   traversing at least one node in the sparse network to generate sentence structures;
   generating, using a neural network, the embeddings from the sentence structures in an embedded space; and
   analyzing the embeddings to determine relationships between nodes.

2. The method of claim 1, further comprising:
   determining a first numerical value associated with the word at a first point in time;
   determining a second numerical value associated with the word at a second point in time; and
   determining a logarithmic return based on the first numerical value and the second numerical value.

3. The method of claim 1, further comprising:
   determining the correlation between the pair of words based on logarithmic returns associated with a first word and a second word in the pair of words.

4. The method of claim 1, wherein the distances are based on logarithmic returns associated with the words in the fully connected network.

5. The method of claim 1, wherein the fully connected network is represented by a correlation matrix that includes the words associated with the nodes for rows and columns and correlations for pairs of words as entries in the correlation matrix.

6. The method of claim 5, further comprising:
   converting the correlation matrix into a distance matrix, wherein the distance matrix includes distances as entries in the distance matrix for the pairs of words.

7. The method of claim 1, wherein the sparse algorithm includes a minimum spanning tree algorithm that removes at least one link in the links from the fully connected network.

8. The method of claim 1, wherein a node-to-vector algorithm traverses the sparse network to generate the sentence structures based on hyperparameters.

9. The method of claim 8, further comprising:
tuning the hyperparameters, wherein the tunning the hyperparameters varies words in the sentence structures.

10. The method of claim 1, wherein a word-to-vector algorithm and the neural network generates the embeddings associated with the words in the fully connected network.

11. The method of claim 1, wherein the embeddings capture syntactic relationships among the words associated with the nodes in the fully connected network.

12. The method of claim 1, wherein the words correspond to stocks and the correlations correspond to prices associated with the stocks.

13. A system for generating embeddings, the system comprising:
a memory configured to store a machine learning framework; and
a processor coupled to the memory and configured to cause the machine learning framework to perform operations, the operations comprising:
generating a fully connected network associated with words, wherein a node in the fully connected network includes a word and a link between a pair of nodes is a correlation between a pair of words corresponding to the pair of nodes;
converting correlations associated with links in the fully connected network into distances;
converting, using a sparse algorithm, the fully connected network into a sparse network based on the distances;
traversing at least one node in the sparse network to generate sentence structures; and
generating, using a neural network in the machine learning framework, the embeddings in an embedded space from the sentence structures.

14. The system of claim 13, wherein the operations further comprise:
determining the correlation between the pair of words based on logarithmic returns associated with numerical features of a first word and a second word in the pair of words.

15. The system of claim 13, wherein the fully connected network is represented by a correlation matrix that includes the words associated with nodes for rows and columns and correlations for pairs of words as entries in the correlation matrix.

16. The system of claim 15, wherein the operations further comprise:
converting the correlation matrix into a distance matrix, wherein the distance matrix includes distances as entries in the distance matrix for the pairs of words.

17. The system of claim 13, wherein the sparse algorithm includes a minimum spanning tree algorithm that removes a subset of links in the links from the fully connected network.

18. The system of claim 13, wherein a node-to-vector algorithm traverses the sparse network to generate the sentence structures having predefined lengths.

19. The system of claim 13, wherein the operations further comprise:
training the neural network to generate the embeddings from the sentence structures and corresponding target words.

20. A non-transitory computer readable medium having instructions stored thereon, that when executed by a processor cause the processor to perform operations for generating embeddings, the operations comprising:
generating a fully connected network associated with words, wherein each node in the fully connected network is a word and a link between a pair of nodes is a correlation of log returns of a pair of words corresponding to the pair of nodes;
generating a correlation matrix, wherein entries in the correlation matrix correspond to links in the fully connected network;
converting the correlation matrix into a distance matrix;
generating a sparse network from the distance matrix, wherein the sparse network has the same number of nodes and fewer links than the fully connected network;
generating, using a node-to-vector algorithm, sentence structures from the sparse network; and
generating using a word-to-vector algorithm, the embeddings for words from the sentence structures.

* * * * *